United States Patent
Liu et al.

(10) Patent No.: US 8,189,181 B2
(45) Date of Patent: May 29, 2012

(54) METHOD AND SYSTEM OF EVALUATING A STEREO IMAGE DISPLAYING PANEL

(75) Inventors: Yen-Chi Liu, Taipei (TW); Cheng-Chung Hu, Taoyuan County (TW)

(73) Assignee: Chunghwa Picture Tubes, Ltd., Taoyuan (TW)

(*) Notice: Subject to any disclaimer, the term of this patent is extended or adjusted under 35 U.S.C. 154(b) by 510 days.

(21) Appl. No.: 12/549,365

(22) Filed: Aug. 28, 2009

(65) Prior Publication Data

US 2010/0328653 A1    Dec. 30, 2010

(30) Foreign Application Priority Data

Jun. 24, 2009   (TW) .............................. 98121146 A

(51) Int. Cl.
- *G01J 1/42* (2006.01)
- *G01J 1/00* (2006.01)
- *G01N 21/00* (2006.01)

(52) U.S. Cl. ...................... 356/218; 356/213; 356/237.1

(58) Field of Classification Search ........... 356/213–236
See application file for complete search history.

(56) References Cited

U.S. PATENT DOCUMENTS

| | | | | |
|---|---|---|---|---|
| 5,309,222 A | * | 5/1994 | Kamei et al. | 356/613 |
| 5,764,209 A | * | 6/1998 | Hawthorne et al. | 345/87 |
| 6,710,321 B2 | * | 3/2004 | Yamaguchi | 250/208.1 |
| 2009/0273720 A1 | * | 11/2009 | Tanaka | 348/790 |
| 2010/0110094 A1 | * | 5/2010 | Kamibayashi et al. | 345/589 |

FOREIGN PATENT DOCUMENTS

CN   101251658   8/2008

OTHER PUBLICATIONS

"Second Office Action of China Counterpart Application", issued on Apr. 1, 2011, p. 1-p. 4.

* cited by examiner

*Primary Examiner* — Gregory J Toatley
*Assistant Examiner* — Jarreas C Underwood
(74) *Attorney, Agent, or Firm* — Jianq Chyun IP Office

(57) ABSTRACT

A method and a system of evaluating a stereo image displaying panel are provided. The evaluation method includes the following steps. An inspection frame is displayed on the stereo image displaying panel, wherein the displaying surface of the stereo image displaying panel has a first normal vector. A luminance of the inspection frame is sensed by an image sensing apparatus, wherein the sensing surface of the image sensing apparatus has a second normal vector. An angle is formed between the first normal vector and the second normal vector. The luminance of the inspection frame is sensed in different angles. A maximum luminance of the inspection frame is sensed by the image sensing apparatus when the angle is equal to a first angle. A luminance uniformity of the inspection frame is analyzed at the first angle. An optimized viewable distance is measured, and the degree of cross-talk is calculated.

11 Claims, 5 Drawing Sheets

METHOD AND SYSTEM OF EVALUATING A STEREO IMAGE DISPLAYING PANEL

CROSS-REFERENCE TO RELATED APPLICATION

This application claims the priority benefit of Taiwan application serial no. 98121146, filed Jun. 24, 2009. The entirety of the above-mentioned patent application is hereby incorporated by reference herein and made a part of specification.

BACKGROUND OF THE INVENTION

1. Field of the Invention

The present invention relates to a method and a system of evaluating a displaying panel. More particularly, the present invention relates to a method and a system of evaluating a stereo image displaying panel.

2. Description of Related Art

According to the visual characteristics of human eyes, a stereoscopic image may be produced when the left and the right eyes respectively see two frames with the same image but different parallax. The mechanism of displaying a stereo image is based on the abovementioned visual characteristic of human eyes and consists of displaying two frames with different parallax, one each respectively for the left eye and right eye, so as to construct a stereo image.

A general method of evaluating a flat panel display is provided as follows. Using an image capturing unit close to the displaying surface of the flat panel display, capture a specific area of an image displayed by the flat panel display, and evaluate the whole display quality of the flat panel display in the light of the display quality of the specific area. However, a fixed distance is required between the stereo image displaying panel and the observer, so that the displaying image observed by the observer will be a stereoscopic image. Therefore, this method of evaluating a flat panel display is rather unsuitable as a method of evaluating a stereo image displaying panel.

The conventional method of evaluating a stereo image displaying panel is usually by judging the display quality of the stereo image displaying panel using the naked eye. However, the judgment result of the above-mentioned method is easily affected by an individual's tendency to fatigue, and the judgment standard thereof lacks consistency. As a result, it is necessary to provide an evaluating data using a quantification method, so as to evaluate the display quality of a stereo image displaying panel.

SUMMARY OF THE INVENTION

The present invention provides a method and a system of evaluating a stereo image displaying panel to evaluate the display quality of stereo image displaying panel by quantizing.

The present invention provides a method of evaluating a stereo image displaying panel including the following steps. First, an inspection frame is displayed on the stereo image displaying panel, wherein the stereo image displaying panel has a first normal vector. Then, a luminance of the inspection frame is sensed by an image sensing apparatus, wherein a sensing surface of the image sensing apparatus has a second normal vector, and an angle is formed between the first normal vector and the second normal vector. Next, the luminance of the inspection frame is sensed in different angles. A maximum luminance of the inspection frame is sensed by the image sensing apparatus while a first angle is formed between the first normal vector and the second normal vector. After that, a luminance uniformity of the inspection frame is analyzed at the first angle. Next, a viewable distance is measured. Afterward, the degree of cross-talk between the frames displayed by the stereo image displaying panel is calculated.

According to an embodiment of the present invention, the inspection frame includes a left-eye frame and a right-eye frame.

In one embodiment of the present invention, the method of obtaining the above first angle includes the following steps. First, a right-eye frame is displayed, and a luminance of the right-eye frame is sensed in different angles. Then, a left-eye frame is displayed, and a luminance of the left-eye frame is similarly sensed in different angles. After that, the luminance of the right-eye frame and the luminance of the left-eye frame is compared in different angles, so as to obtain an angle corresponding to the maximum luminance, and said angle is defined as a first angle.

According to an embodiment of the present invention, the method of analyzing the luminance uniformity of the inspection frame includes the following steps. First, an axis X disposed on the center of the inspection frame is chosen. Next, the luminance of each point on the X axis is sensed, so as to obtain a luminance distribution curve, in which each point on the X axis relative to the corresponding luminance is illustrated. Afterward, a luminance uniformity of the inspection frame is judged by using the obtained luminance distribution curve. According to an embodiment of the present invention, further include using the following formula (1) to obtain the viewable distance. In formula (1), $\theta_k$ represents an optimized viewing angle, E represents a distance between two eyes of an observer, and d represents a viewable distance.

$$\theta_k = \tan\frac{\frac{1}{2}E}{d} \qquad \text{formula (1)}$$

According to an embodiment of the present invention, the viewable distance ranges from 30 centimeters to 8 meters.

According to an embodiment of the present invention, further include using the following formula (2) to define a degree of cross-talk between the left-eye frame and the right-eye frame. In formula (2), $R_{min}$ represents a minimum luminance of the right-eye frame, $L_{min}$ represents a minimum luminance of the left-eye frame, $L_{max}$ represents a maximum luminance of the left-eye frame, $R_{max}$ represents a maximum luminance of the right-eye frame.

$$CR = \frac{R_{min}(L_{min})}{L_{max}(R_{max})} \times 100\% \qquad \text{formula (2)}$$

The present invention provides a system of evaluating stereo image displaying panel including a rotary stage, an image sensing apparatus, and an analyzing control apparatus. A stereo image displaying panel is disposed on a rotary stage, wherein the stereo image displaying panel displays an inspection frame, and the stereo image displaying panel has a first normal vector. The image sensing apparatus is disposed in front of the stereo image displaying panel, so as to sense the luminance of the inspection frame, wherein the sensing surface of the image sensing apparatus has a second normal vector, and an angle is formed between the first normal vector and the second normal vector. The analyzing control apparatus is connected to the rotary stage and the image sensing apparatus, respectively, so as to control the rotary stage to rotate to different angles and control the image sensing apparatus to sense the luminance of the inspection frame in different angles. Moreover, the analyzing control apparatus transforms the obtained luminance into a plurality of information and stores the information.

According to an embodiment of the present invention, the system of evaluating the stereo image displaying panel further includes a movable stage disposed in front of the rotary stage, wherein the movable stage moves along a first direction toward the rotary stage or moves along a second direction away from the rotary stage, and the image sensing apparatus is disposed on the movable stage.

According to an embodiment of the present invention, the image sensing apparatus includes a lens and an image sensing device. The lens has focus function, and aligns with the stereo image displaying panel. Besides, the image sensing device is connected to the lens, and senses the luminance of the inspection frame displayed by the stereo image displaying panel.

According to an embodiment of the present invention, the image sensing device is a charge coupled device (CCD).

According to an embodiment of the present invention, the analyzing control apparatus includes an analyzing control host and a control screen. The analyzing control host is electrically connected to the stereo image displaying panel and the image sensing apparatus. Besides, the control screen is connected to the analyzing control host, so as to display an operation interface of the analyzing control host.

In light of the foregoing, the method and system of evaluating a stereo image displaying panel of the present invention is capable of quantizing the display quality of the stereo image displaying panel through analyzing the luminance distribution thereof, so as to provide a consistent standard when evaluating the stereo image displaying panel.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
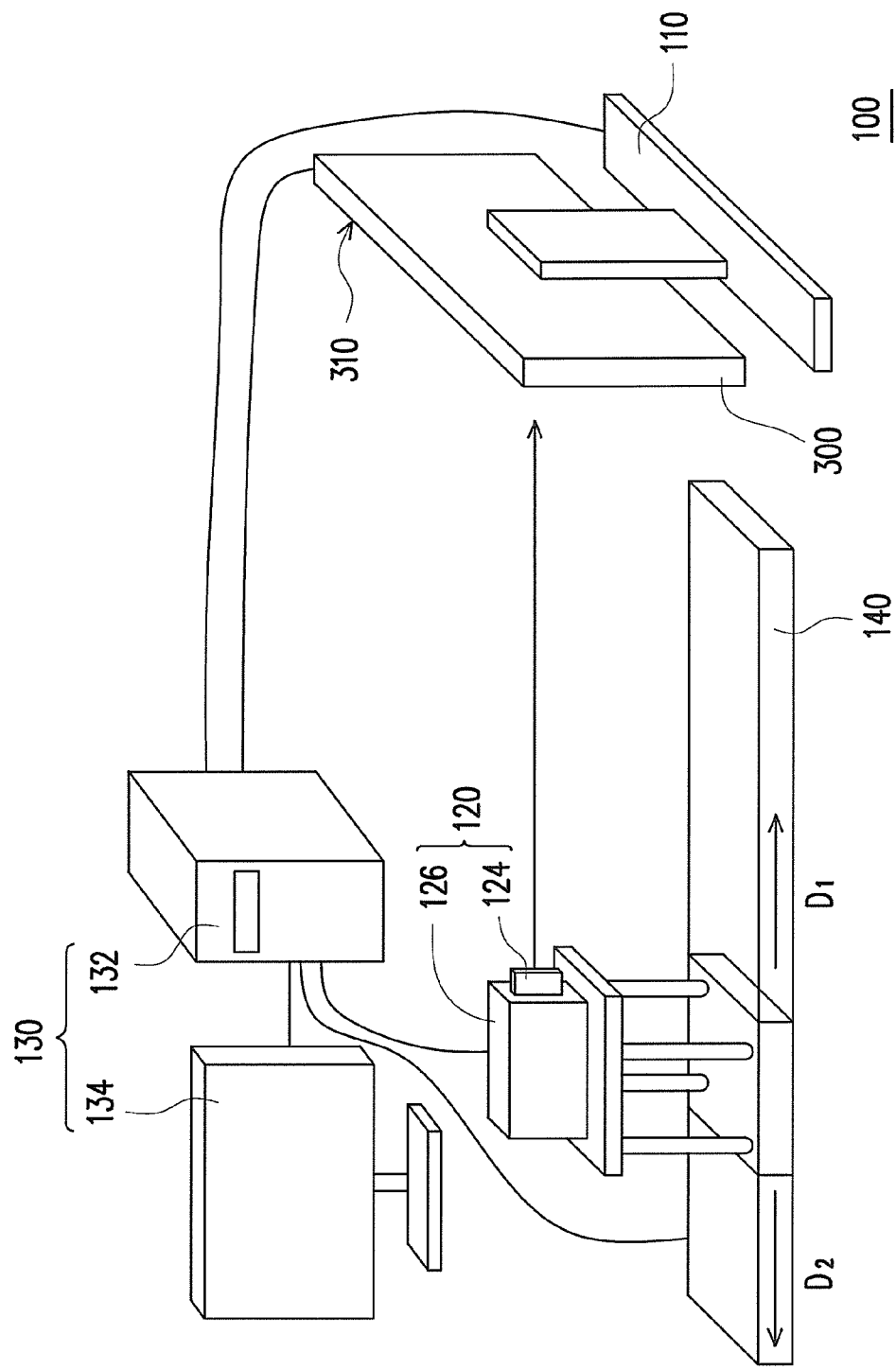
FIG. 1A schematically illustrates an evaluation system of a stereo image displaying panel according to an embodiment of the present invention.
Figure 1B:
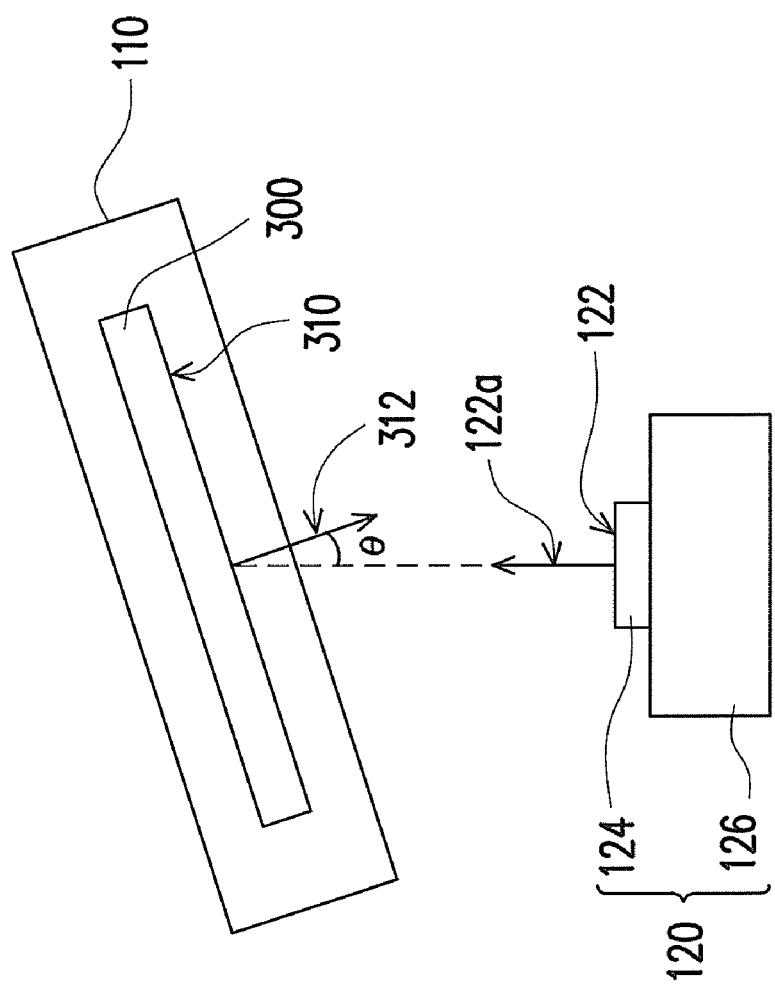
FIG. 1B is a top view of the stereo image displaying panel and the image sensing apparatus shown in FIG. 1A.
Figure 2:
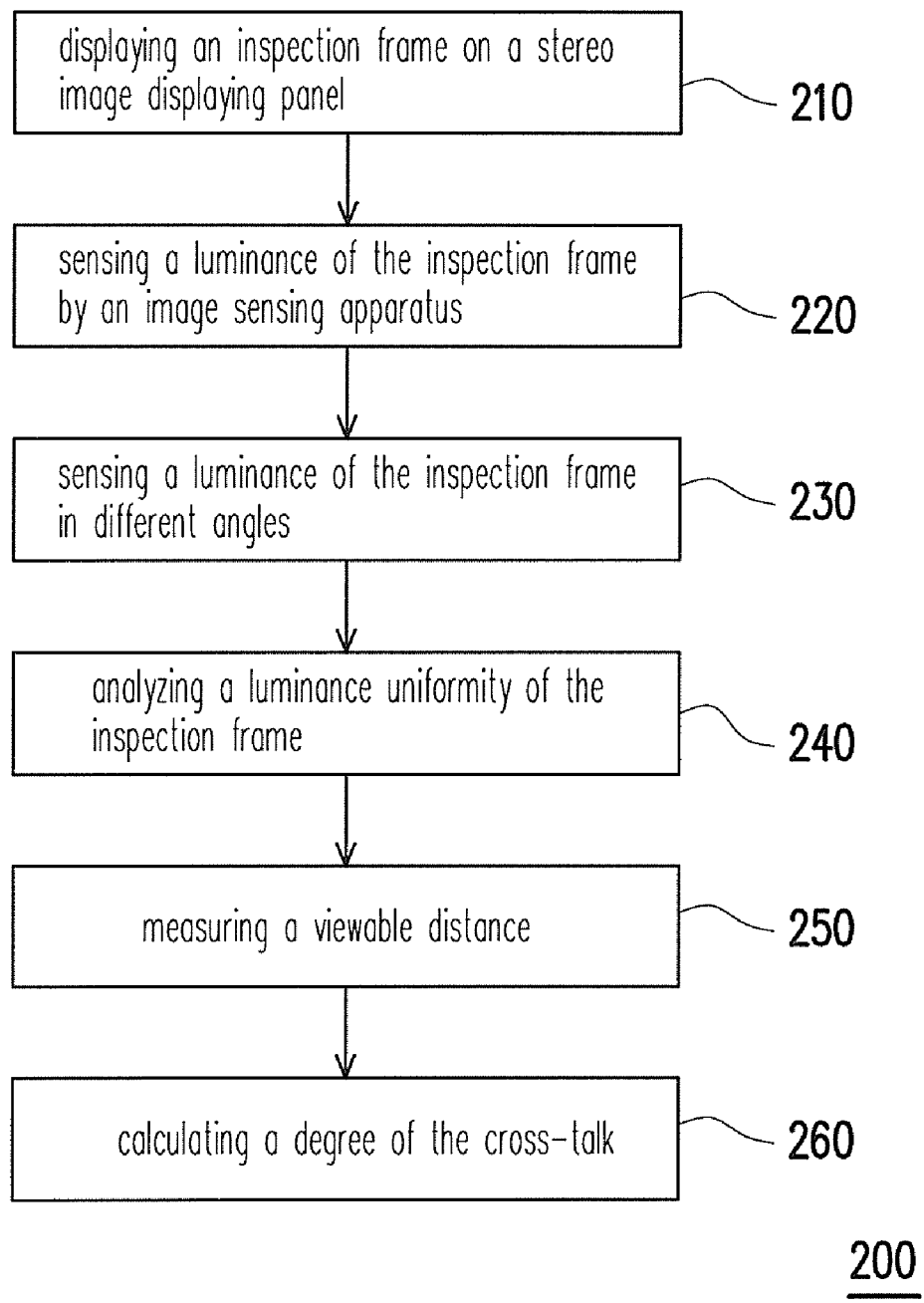
FIG. 2 is a schematic diagram showing the steps for evaluating a stereo image displaying panel according to an embodiment of the present invention.

FIG. 1A schematically illustrates an evaluation system of stereo image displaying panel according to an embodiment of the present invention. FIG. 1B is a top view of the stereo image displaying panel and the image sensing apparatus shown in FIG. 1A. FIG. 2 is a schematic diagram showing the steps for evaluating a stereo image displaying panel according to an embodiment of the present invention.

As shown in FIGS. 1A and 2, the system of evaluating a stereo image displaying panel 100 of the present embodiment includes a rotary stage 110, an image sensing apparatus 120 and an analyzing control apparatus 130. In addition, the evaluation system may selectively include a movable stage 140. The evaluation method of the present embodiment includes the steps from step 210 to step 240, as shown in FIG. 2.

As shown in FIGS. 1A and 1B, the stereo image displaying panel 300 is first disposed on the rotary stage 110. The image sensing apparatus 120 is disposed in front of the stereo image displaying panel 300, so as to sense the luminance of the inspection frame. In addition, the analyzing control apparatus 130 is connected to the rotary stage 110 and the image sensing apparatus 120, respectively. The analyzing control apparatus 130 may include an analyzing control host 132 and a control screen 134. The analyzing control host 132 is electrically connected to the stereo image displaying panel 300, the rotary stage 110, the movable stage 140 and the image sensing apparatus 120. The control screen 134 connects to the analyzing control host 132, wherein the control screen 134 is used for displaying an operation interface of the analyzing control host 132.

The analyzing control apparatus 130 controls the rotary stage 110 to rotate to different angles, and controls the image sensing apparatus 120 to sense the luminance of the inspection frame in different angles, and transforms the sensed luminance into a plurality of information, and stores the information.

In addition, the image sensing apparatus 120 is disposed on the moveable stage 140. The moveable stage 140 is disposed in front of the rotary stage 110, the movable stage 140 moves along a first direction $D_1$ toward the rotary stage 110 or moves along a second direction $D_2$ away from the rotary stage 110.

As shown in FIGS. 1A, 1B and 2, performing a step 210 to display an inspection frame on the stereo image displaying panel 300, wherein the displaying surface 310 of the stereo image displaying panel 300 has a first normal vector 312. The inspection frame may include a left-eye frame and a right-eye frame. The left-eye frame is, for example, a totally black frame, and the right-eye frame is, for example, a totally white frame. However, the present invention is not limited to the color of the left-eye frame and the right-eye frame, which may adjust and vary depending upon actual design requirements. The stereo image displaying panel 300 may selectively display the left-eye frame or the right-eye frame using a switching method, and in addition, the stereo image displaying panel 300 may simultaneously display the left-eye frame and the right-eye frame.

Afterward, a step 220 is performed to sense a luminance of the inspection frame by an image sensing apparatus 120, wherein a sensing surface 122 of the image sensing apparatus 120 has a second normal vector 122a, and an angle θ is formed between the second normal vector 122a and the first normal vector 312. More specifically, the image sensing apparatus 120 may include a lens 124 and an image sensing device 126. The lens 124 has a focus function, and aligns with the stereo image displaying panel 300. The image sensing device 126 is connected to the lens 124, and senses the luminance of the inspection frame displayed by the stereo image displaying panel 300. The image sensing device 126 is a charge coupled device (CCD), for example.

After that, a step 230 is performed to sense the luminance of the inspection frame in different angles. In more detail, when the rotary stage 110 is rotated, the angle θ between the first normal vector 312 of the displaying surface 310 of the stereo image displaying panel 300 and a second normal vector 122a of the sensing surface 122 of the image sensing apparatus 120 is changed. The luminance of the inspection frame sensed by the image sensing apparatus 120 changes with the different angles θ. A maximum luminance of the inspection frame is sensed by the image sensing apparatus 120 while a first angle $\theta_1$ is formed between the second normal vector 122a and the first normal vector 312. More specifically, a method of obtaining the first angle $\theta_1$ is described as the following exemplary description.

First, a right-eye frame is displayed, and a luminance of the right-eye frame is sensed in different angles.

Then, a left-eye frame is displayed, and a luminance of the left-eye frame is sensed in different angles.

However, the sequence of displaying the right-eye frame and the left-eye frame is not limited, and may first display the left-eye frame, and then display the right-eye frame. After that, compare the luminance of the right-eye frame and that of the left-eye frame in different angles, so as to obtain an angle corresponding to the maximum luminance, and define the angle as a first angle.

Figure 3:
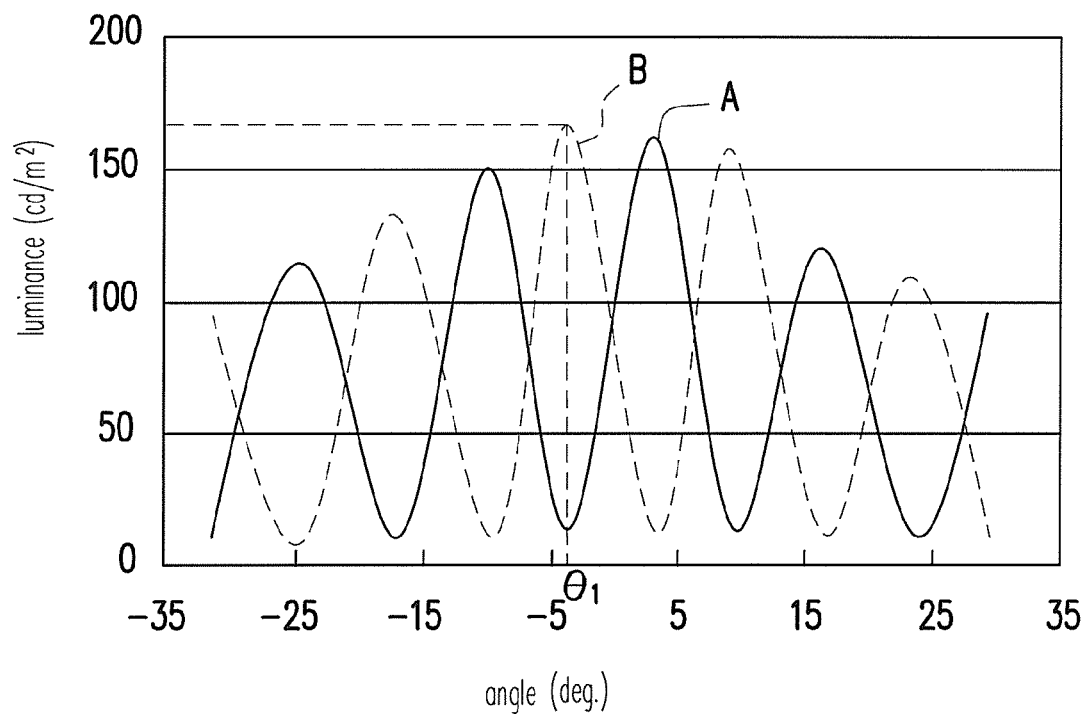
FIG. 3 is a schematic comparison diagram of a luminance of the right-eye frame and a luminance of the left-eye frame under different angles according to an embodiment of the present invention.

FIG. 3 is a schematic comparison diagram of a luminance of the right-eye frame and a luminance of the left-eye frame under different angles according to an embodiment of the present invention. Referring to FIG. 3, a luminance of the right-eye frame is sensed in different angles, so as to illustrate a curve A in FIG. 3 in which different angles relative to the corresponding sensed luminance is illustrated. Similarly, a luminance of the left-eye frame is sensed in different angles, so as to illustrate a curve B in FIG. 3 in which different angles relative to the corresponding sensed luminance is illustrated. As clearly shown in FIG. 3, compare the luminance of the right-eye frame and the luminance of the left-eye frame in different angles, such that an angle corresponding to the maximum luminance is obtained, and the angle is thus defined as a first angle $\theta_1$.

Referring to FIG. 2, a step 240 is then performed to analyze a luminance uniformity of the inspection frame in different angles. A method of analyzing the luminance uniformity of the inspection frame is described as the following exemplary description. First, an axis X disposed on the center of the inspection frame is chosen. It is preferred to choose an axis X exactly disposed on the center of the inspection frame. Afterward, the luminance of each point on the X axis is sensed, so as to obtain a luminance distribution curve, in which each point on the X axis relative to the corresponding luminance is illustrated. Then, a luminance uniformity of the inspection frame is judged by using the obtained luminance distribution curve.

Figure 4:
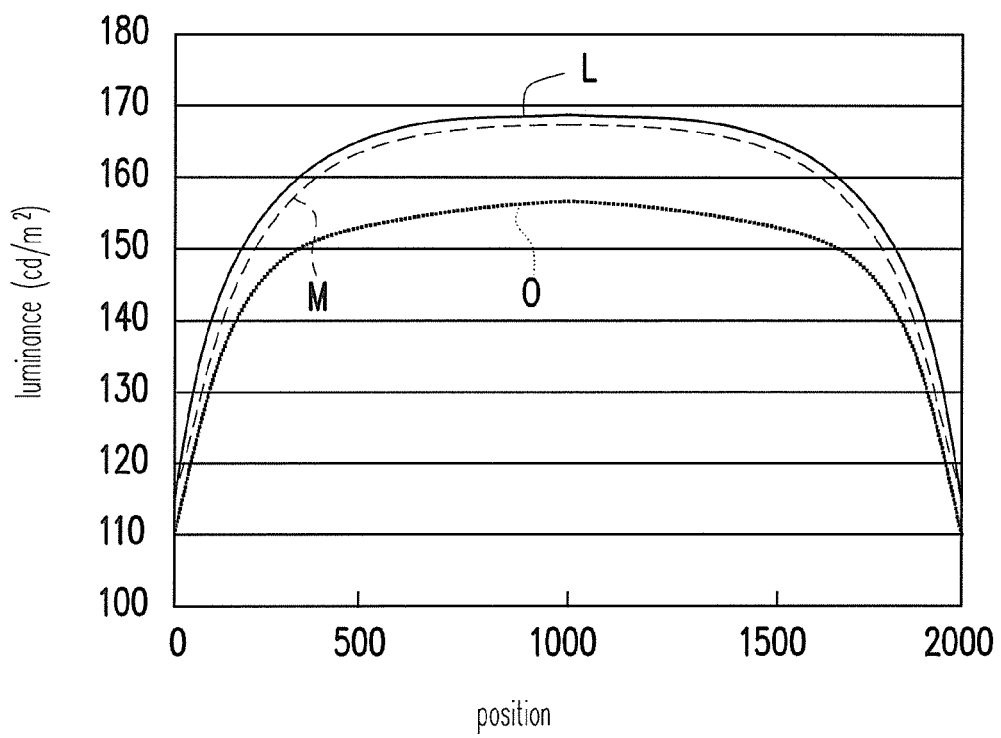
FIG. 4 is a schematic diagram of luminance distribution curve under the first angle and different angles according to an embodiment of the present invention.

FIG. 4 is a schematic diagram of luminance distribution curve under the first angle and different angles according to an embodiment of the present invention. Referring to FIG. 4, the horizontal axis represents the corresponding position of each point at the chosen X axis. The vertical axis represents the luminance corresponding to each point on the X axis. The luminance distribution curve is illustrated under certain angles whose values are around the first angle $\theta_1$, and a viewing angle corresponding to the optimized uniformity is selected as an optimized viewing angle $\theta_k$. In this embodiment, a luminance distribution curve L is illustrated when the luminance sensed at a first angle $\theta_1$ is 3.57 degrees, for example, and a luminance distribution curve M is illustrated when the luminance sensed at a first angle $\theta_1$ is 3.87 degrees, for example. Moreover, a luminance distribution curve O is illustrated when the luminance sensed at a first angle $\theta_1$ is 2.37 degrees, for example. As shown in FIG. 4, the curve of the luminance distribution curve L illustrated when the luminance sensed at a first angle $\theta_1$ is 3.57 degrees is smoother than other luminance distribution curves, which represents that the luminance distribution is more uniform when the luminance is sensed at 3.57 degrees. In this embodiment, the optimized viewing angle $\theta_k$ is thus 3.57 degrees.

The method of evaluating a stereo image displaying panel 200 of the present embodiment may further include using the following formula (1) to obtain the viewable distance. In formula (1), $\theta_k$ represents an optimized viewing angle, E represents a distance between two eyes of the observer, and d represents a viewable distance. A calculated viewable distance is defined as an optimized viewable distance when the viewing angle corresponds to the optimized luminance uniformity. The viewable distance ranges from 30 centimeters to 8 meters according to various sizes of the stereo image displaying panel 300.

$$\theta_k = \tan \frac{\frac{1}{2}E}{d} \quad \text{formula (1)}$$

Figure 5:
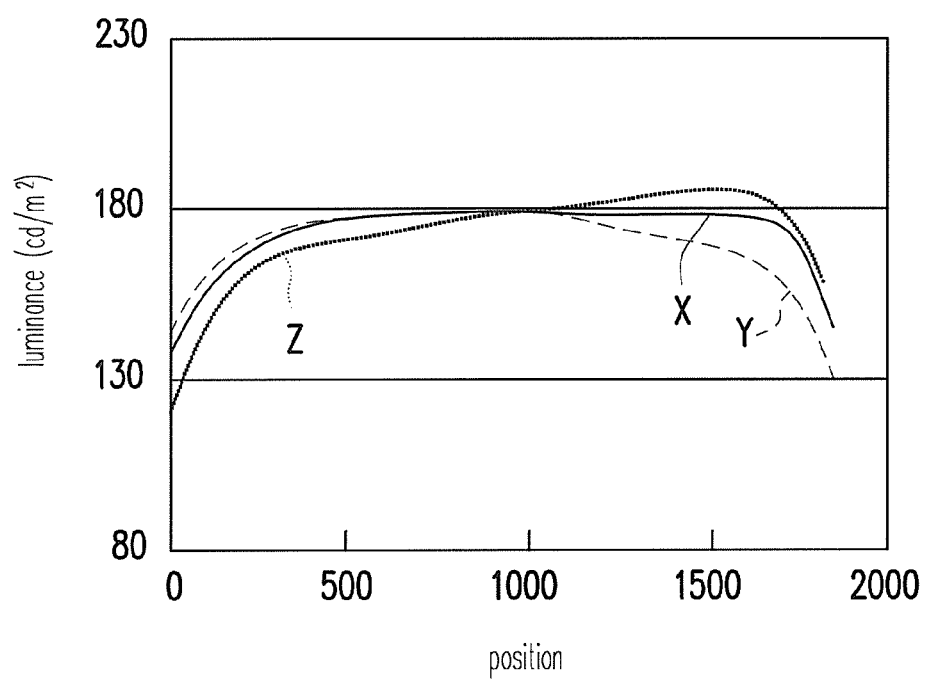
FIG. 5 is a schematic diagram of the sensing luminance distribution curve under different viewable distances at the first angle according to another embodiment of the present invention.

FIG. 5 is a schematic diagram of the sensing luminance distribution curve under different viewable distances at the first angle according to another embodiment of the present invention. Referring to FIG. 5, the size of stereo image displaying panel 300 used in this embodiment is 15.4 inches, for example. According to the evaluating steps of the foregoing embodiments, the obtained optimized angle is 3.57 degrees, and a luminance distribution of the inspection frame is sensed at the optimized angle by various viewable distances. As shown in FIG. 5, the sensed luminance distribution curve is X when the viewable distance is 52 centimeters, the sensed luminance distribution curve is Y when the viewable distance is 50 centimeters, and the sensed luminance distribution curve is Z when the viewable distance is 60 centimeters. As clearly shown in FIG. 5, the sensed luminance distribution curve is the most uniform when the viewable distance is 52 centimeters. In other words, the stereo image displaying panel 300 of this embodiment has an optimized display quality when the viewable distance is 52 centimeters at the optimized angle.

Finally, the method of evaluating a stereo image displaying panel of this embodiment may include the following formula (2) to define a degree of cross-talk CR between the left-eye frame and the right-eye frame. In formula (2), $R_{min}$ represents a minimum luminance of the right-eye frame, $L_{min}$ represents a minimum luminance of the left-eye frame, $L_{max}$ represents a maximum luminance of the left-eye frame, $R_{max}$ represents a maximum luminance of the right-eye frame. Take FIG. 3 as an example for description, a degree of cross-talk CR between the left-eye frame and the right-eye frame could be obtained by using the minimum luminance of curve A divided by the maximum luminance of curve B and then multiplied by 100%. On the contrary, it can also be calculated by using the minimum luminance of curve B and the maximum luminance of curve A.

$$CR = \frac{R_{min}(L_{min})}{L_{max}(R_{max})} \times 100\% \qquad \text{formula (2)}$$

According to the above descriptions, a method and a system of evaluating a stereo image displaying panel of the present invention may obtain the luminance distribution curve by obtaining the luminance of the stereo image displaying panel and analyzing the luminance sensed in different angles. Moreover, the display quality of the stereo image displaying panel may be judged according to the luminance distribution curve. Therefore, the display quality of the stereo image displaying panel is capable of being evaluated by a quantification method.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A method of evaluating a stereo image displaying panel, comprising:
   displaying an inspection frame on a stereo image displaying panel, wherein a displaying surface of the stereo image displaying panel has a first normal vector;
   sensing a luminance of the inspection frame by an image sensing apparatus, wherein a sensing surface of the image sensing apparatus has a second normal vector, and an angle is formed between the first normal vector and the second normal vector;
   sensing a luminance of the inspection frame in different angles, wherein a maximum luminance of the inspection frame is sensed by the image sensing apparatus when a first angle is formed between the first normal vector and the second normal vector;
   analyzing a luminance uniformity of the inspection frame under the different angles;
   measuring a viewable distance of the stereo image displaying panel; and
   calculating a degree of the cross-talk between frames displayed by the stereo image displaying panel;
   wherein the inspection frame includes a left-eye frame and a right-eye frame.

2. The method of evaluating a stereo image displaying panel as claimed in claim 1, wherein a method of obtaining the first angle comprises:
   displaying the right-eye frame, and sensing a luminance of the right-eye frame in the different angles;
   displaying the left-eye frame, and sensing a luminance of the left-eye frame in the different angles;
   comparing the luminance of the right-eye frame and the luminance of the left-eye frame in the different angles, so as to obtain an angle corresponding to the maximum luminance, wherein the angle is defined as the first angle.

3. The method of evaluating a stereo image displaying panel as claimed in claim 1, wherein a method of calculating the degree of cross-talk comprises using the following formula (2) to define the degree of cross-talk between the left-eye frame and the right-eye frame:

$$CR = \frac{R_{min}(L_{min})}{L_{max}(R_{max})} \times 100\% \qquad \text{formula (2)}$$

wherein $R_{min}$ represents a minimum luminance of the right-eye frame, $L_{min}$ represents a minimum luminance of the left-eye frame, $L_{max}$ represents a maximum luminance of the left-eye frame, $R_{max}$ represents a maximum luminance of the right-eye frame.

4. The method of evaluating a stereo image displaying panel as claimed in claim 1, wherein a method of analyzing the luminance uniformity of the inspection frame comprises:
   choosing an axis X disposed on the center of the inspection frame;
   sensing a luminance of each point on the X axis, so as to obtain a luminance distribution curve, in which each point on the X axis relative to the corresponding luminance is illustrated; and
   judging the luminance uniformity of the inspection frame by the luminance distribution curve.

5. The method of evaluating a stereo image displaying panel as claimed in claim 1, wherein a method of measuring the viewable distance of the stereo image displaying panel comprises using a following formula (1) to obtain the viewable distance:

$$\theta_k = \tan\frac{\frac{1}{2}E}{d} \qquad \text{formula (1)}$$

wherein $\theta_k$ represents an optimized viewing angle, E represents a distance between two eyes of an observer, and d represents the viewable distance.

6. The method of evaluating a stereo image displaying panel as claimed in claim 5, wherein a range of the viewable distance is substantially between 30 centimeters to 8 meters.

7. A system of evaluating a stereo image displaying panel, comprising:
   a rotary stage, wherein a stereo image displaying panel is disposed on the rotary stage, the stereo image displaying panel displays an inspection frame, and a displaying surface of the stereo image displaying panel has a first normal vector;
   an image sensing apparatus, disposed in front of the stereo image displaying panel, the image sensing apparatus senses a luminance of the inspection frame, wherein a sensing surface of the image sensing apparatus has a second normal vector, and an angle is formed between the first normal vector and the second normal vector; and
   an analyzing control apparatus, connected to the rotary stage and the image sensing apparatus respectively, wherein the rotary stage is controlled to rotate to different angles by the analyzing control apparatus, the image sensing apparatus is controlled to sense the luminance of the inspection frame in different angles by the analyzing control apparatus, and the analyzing control apparatus transforms the obtained luminance into a plurality of information, stores the information and calculates a degree of the cross-talk between frames displayed by the stereo image displaying panel;
   wherein the inspection frame includes a left-eye frame and a right-eye frame.

8. The system of evaluating a stereo image displaying panel as claimed in claim 7, further comprising a movable stage, disposed in front of the rotary stage, wherein the movable stage moves along a first direction toward the rotary stage or moves along a second direction away from the rotary stage, and the image sensing apparatus is disposed on the movable stage.

9. The system of evaluating a stereo image displaying panel as claimed in claim 7, wherein the image sensing apparatus comprises:
- a lens, having a focus function, wherein the lens aligns with the stereo image displaying panel; and
- an image sensing device, connected to the lens, and sensing the luminance of the inspection frame displayed by the stereo image displaying panel.

10. The system of evaluating a stereo image displaying panel as claimed in claim 9, wherein the image sensing device comprises a charge coupled device.

11. The system of evaluating a stereo image displaying panel as claimed in claim 7, wherein the analyzing control apparatus comprises:
- an analyzing control host, electrically connected to the stereo image displaying panel and the image sensing apparatus; and
- a control screen, connected to the analyzing control host, wherein the control screen displays an operation interface of the analyzing control host.

* * * * *